United States Patent [19]
Okada et al.

[11] Patent Number: 5,638,209
[45] Date of Patent: Jun. 10, 1997

[54] MIRROR APPARATUS

[75] Inventors: Shoji Okada, Anjo; Hirotsugu Sugiura, Hekinan; Masumi Nishikawa, Toyoake; Chiaki Yamada, Hekinan, all of Japan

[73] Assignee: Aisin Seiki Kabushiki Kaisha, Kariya, Japan

[21] Appl. No.: 387,089

[22] Filed: Feb. 13, 1995

[30] Foreign Application Priority Data

Feb. 14, 1994 [JP] Japan .................................. 6-017334
Feb. 14, 1994 [JP] Japan .................................. 6-017335

[51] Int. Cl.$^6$ .................. G02B 5/08; B08B 7/02; B60S 1/02; H01L 41/04
[52] U.S. Cl. .................. 359/507; 15/250.02; 15/250.003; 310/335; 310/366; 310/368
[58] Field of Search .................. 359/507, 509; 15/250.02, 250.003; 310/366, 313 R, 322, 323, 365, 367, 368, 369, 334, 335

[56] References Cited

U.S. PATENT DOCUMENTS

| | | | |
|---|---|---|---|
| 3,171,683 | 3/1965 | Ludwig | 359/507 |
| 4,571,519 | 2/1986 | Kawabata et al. | |
| 4,583,017 | 4/1986 | Nakamura et al. | |
| 4,614,410 | 9/1986 | Ikemaga et al. | |
| 4,692,653 | 9/1987 | Kushida et al. | |
| 4,833,373 | 5/1989 | Doi et al. | 359/507 |
| 4,974,945 | 12/1990 | Kumada | |
| 5,013,888 | 5/1991 | Okada et al. | 359/507 |
| 5,025,187 | 6/1991 | Fujie et al. | 359/507 |
| 5,037,189 | 8/1991 | Fujie et al. | 359/507 |
| 5,132,840 | 7/1992 | Okada et al. | |
| 5,136,425 | 8/1992 | Fujie et al. | |
| 5,148,312 | 9/1992 | Kawai et al. | |

FOREIGN PATENT DOCUMENTS

| | | | |
|---|---|---|---|
| 0070745 | 5/1982 | Japan | 359/507 |
| 59-8548 | 1/1984 | Japan | 359/507 |
| 415146 | 1/1992 | Japan | |
| 1079732 | 8/1967 | United Kingdom | 359/507 |

*Primary Examiner*—Ricky D. Shafer
*Attorney, Agent, or Firm*—Burns, Doane, Swecker & Mathis, LLP

[57] ABSTRACT

An outer rear view mirror for a vehicle includes a casing for being connected to a side portion of the vehicle, a mirror member having an outer surface and accommodated within the casing such that the outer surface extends substantially perpendicular to a road surface, and a generator positioned at an upper portion of the outer surface of the mirror member and generating surface acoustic waves which travel along the outer surface of the mirror member towards a lower portion thereof. Water drops on the outer surface of the mirror member are expected to be urged to the lower portion of the mirror member, which results in that the resultant water drops are expelled by the gravity. Thus, the water drops can be removed from the outer surface of the mirror member.

11 Claims, 5 Drawing Sheets

U.S. Patent  Jun. 10, 1997  Sheet 1 of 5  5,638,209

MIRROR APPARATUS

BACKGROUND OF THE INVENTION

The present invention relates to a mirror apparatus and in particular to a mirror apparatus which can remove water drops adhered thereon.

A conventional mirror apparatus of the type is disclosed in the U.S. Pat. No. 5,037,189 issued on Aug. 6, 1991. In this apparatus, an ultrasonic vibrator is attached to a back portion of a mirror plate and when the ultrasonic vibrator is turned on the mirror plate is vibrated, thereby repelling water drops on a surface of the mirror plate.

However, the vibration of the mirror brings repeated deformation of the mirror plate, which results in that the mirror plate per se has to be reinforced in order to prevent the crack or breakage of the mirror plate. This leads to an increase a total weight of the outer rear view mirror. In addition, only the vibration of the mirror plate sometimes may fail to repel small water drops on the surface of the mirror plate.

SUMMARY OF THE INVENTION

It is an object of the invention to provide a mirror apparatus which obviate the above conventional drawbacks.

It is another object of the invention to provide a mirror apparatus in which a plate member is free from reinforcing.

It is further object of the invention to provide a mirror apparatus which can repel small water drops on a mirror plate.

In order to attain the foregoing objects, a mirror apparatus for use in a vehicle is comprised of a casing for being connected to a side portion of the vehicle, a mirror member having an outer surface and accommodated within the casing such that the outer surface extends substantially perpendicular to a road surface, and a generator positioned at an upper portion of the outer surface of the mirror member and generating surface acoustic waves which travel along the outer surface of the mirror member towards a lower portion thereof.

In accordance with the resultant outer rear view mirror for a vehicle, water drops on the outer surface of the mirror member are expected to be urged to the lower portion of the mirror member, which results in that the resultant water drops are expelled by the gravity. Thus, the water drops can be removed from the outer surface of the mirror member.

BRIEF DESCRIPTION OF THE DRAWINGS

The above and other objects, features and advantages of the present invention will be more apparent and more readily appreciated from the following detailed description of preferred exemplary embodiments of the present invention, taken in connection with the accompanying drawings, in which.

DESCRIPTION OF THE PREFERRED EMBODIMENTS

Figure 2:
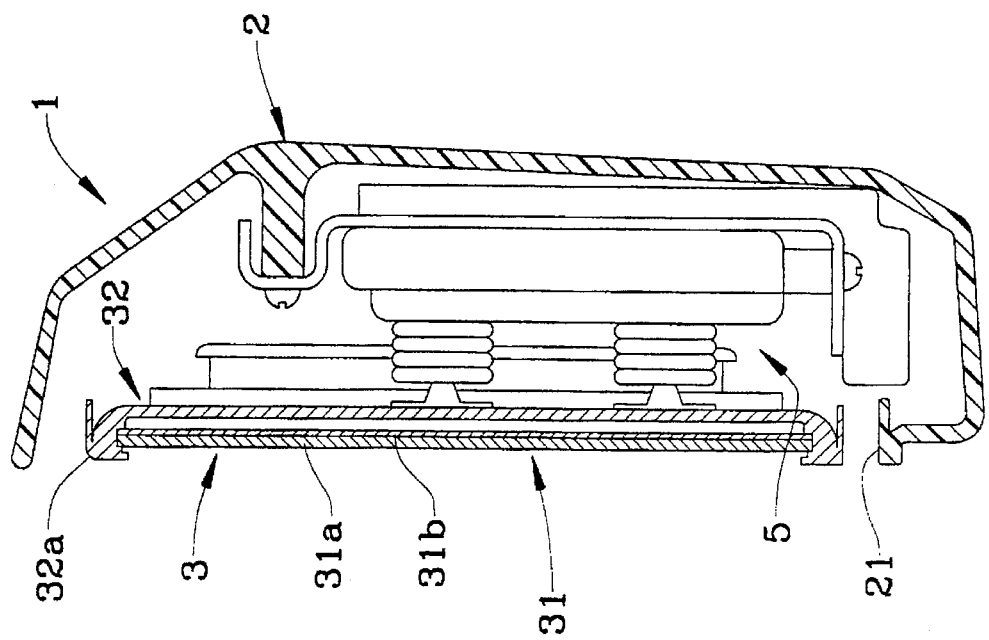
FIG. 2 is a vertical cross-sectional view of the mirror apparatus shown in FIG. 1.
Figure 1:
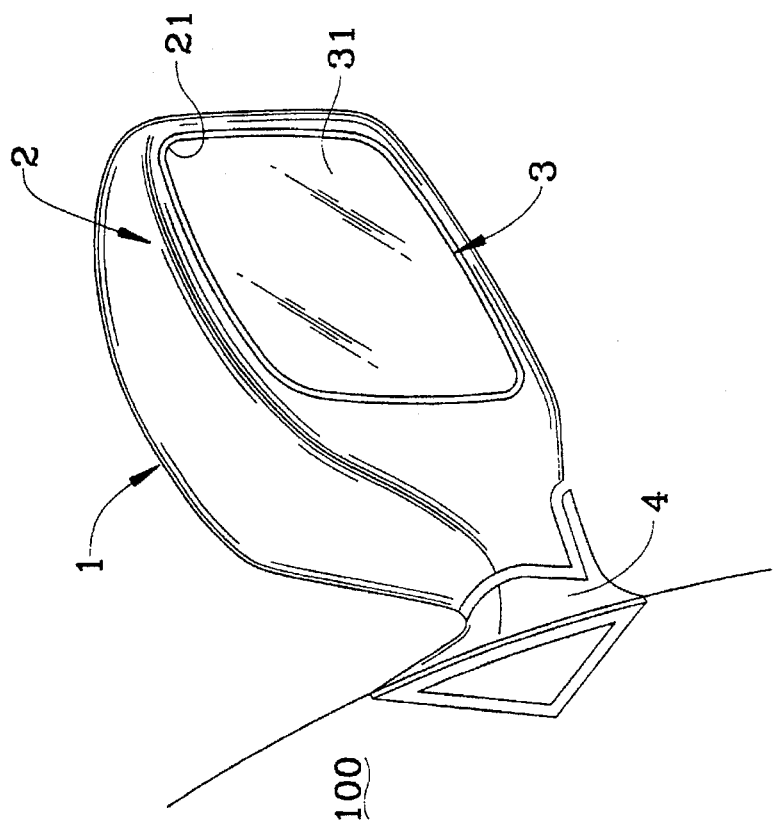
FIG. 1 is a perspective view of a mirror apparatus in accordance with the present invention.

Referring first to FIGS. 1 and 2, there is illustrated an outer rear view mirror apparatus 1 for a vehicle 100. The outer rear view mirror apparatus 1 includes a casing 2 made of a synthetic resin which is secured via a stay 4 to a door of the vehicle 100. The casing 2 has an opening 21 through which an inner space is accessible. Between the casing 2 and the stay 4, an electrical driving device (not shown) can be provided which enables that the casing 2 takes a rest position and an operating position, selectively.

Figure 3:
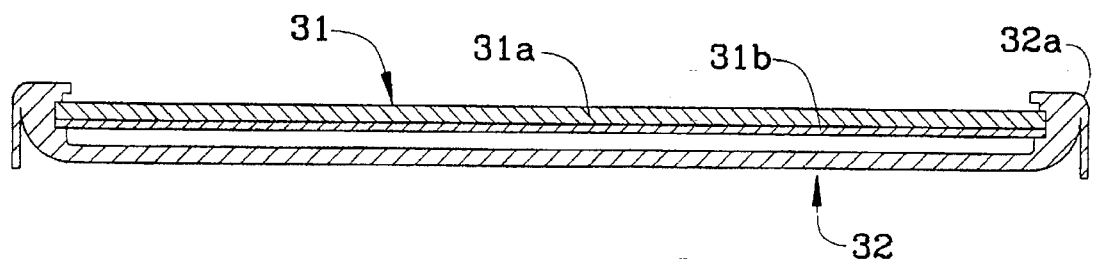
FIG. 3 is a vertical cross-sectional view of a mirror assembly of the mirror apparatus shown in FIG. 1.

A mirror assembly 3 is accommodated within the inner space of the casing 2. The mirror assembly 3 is used to watch a rear view of the vehicle 100 from a driver's seat in the vehicle 100. As best seen in FIGS. 2 and 3, the mirror assembly 3 has a mirror plate 31 which is constituted by a transparent outer or front member 31a such as glass and a reflecting inner or back member 31b such as an aluminum plate. A holder 32 has a holding portion 32a which is in the form of an inner groove. The mirror plate 33 which is defined by the layered structure of the transparent outer member 31a and the reflecting inner member 31b is held by the holding portion 32a of the holder 32 in such a manner that the inner member 31b is oriented to the inner space of the casing 2. The mirror assembly 3 which is thus constructed is connected to an electric mirror angle adjusting device 5 which is fixedly accomodated in the casing 2 in such a manner that the outer member 31a closes the opening 21 of the casing 2, the outer member 31a exposed outwardly and an outer surface of the outer member 31a makes an angle of about 90 degrees relative to a road surface (not shown). The angle between the outer surface of the outer member 31a and the road surface can be adjusted by the electric mirror angle adjusting device 5. It is to be noted that the outer surface of the outer member 31a is provided with a water-repel treatment.

Figure 4:
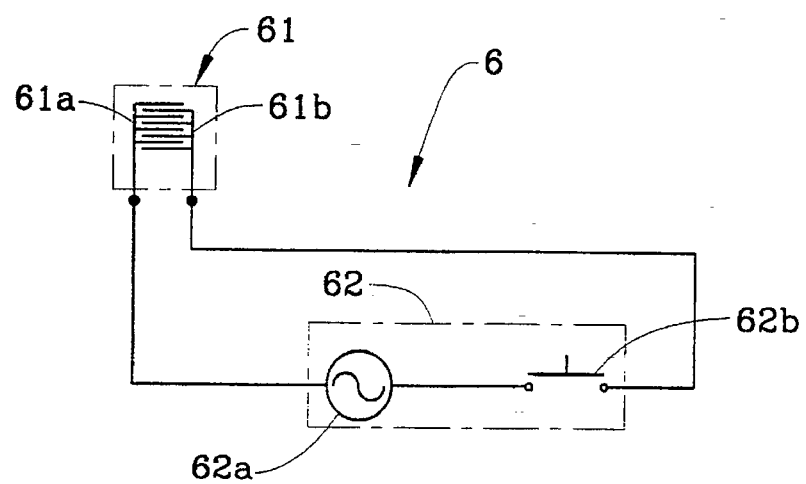
FIG. 4 is a circuit diagram of a generator for generating surface acoustic waves.

As seen in FIG. 4, a generator 6 which generates surface acoustic waves includes an electrode device 61 having a pair of oppositely spaced electrodes 61a and 61b each of which is made of an aluminum or other good conductor material. A driving circuit 62 includes an AC power supply 62a which can be obtained by a combination of an on-vehicle DC power supply and an oscillator both of which are not shown. One end of the AC power supply 62a is connected to the electrode 61a and the other end thereof is connected via a switch 62b to the electrode 61b. The electrode 61a is formed into a toothed configuration and the electrode 61b is formed into a toothed configuration so as to be symmetrical with the electrode 61a. Each tooth of the electrode 61a is loosely fitted or positioned between two adjacent teeth of the electrode 61b.

Figure 5:
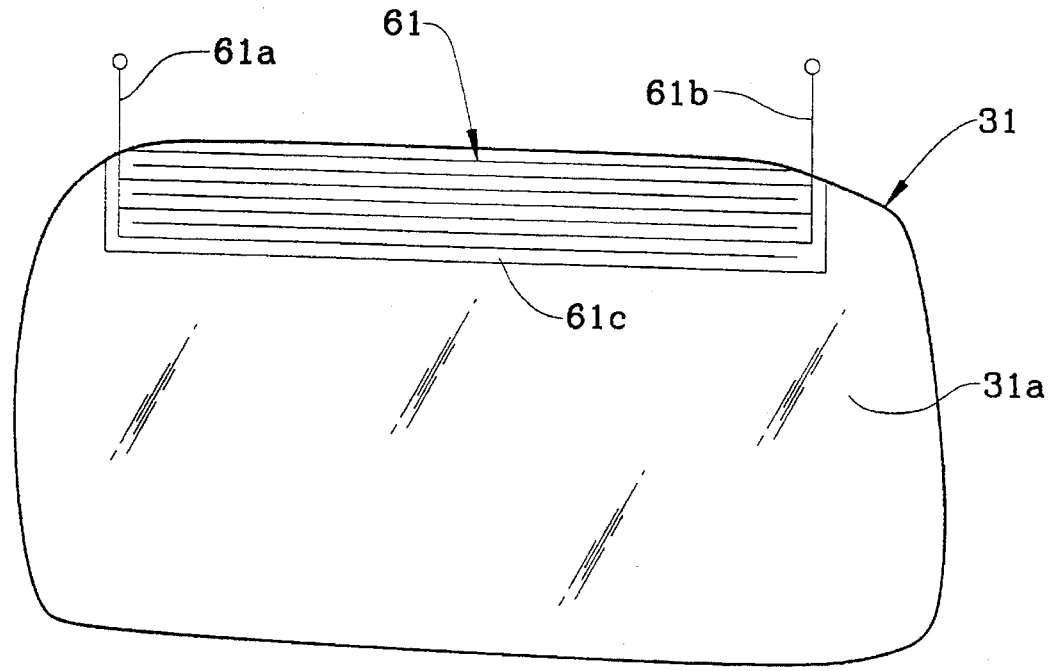
FIG. 5 is a plane view showing a first mode of a generator for generating surface acoustic waves.
Figure 6:
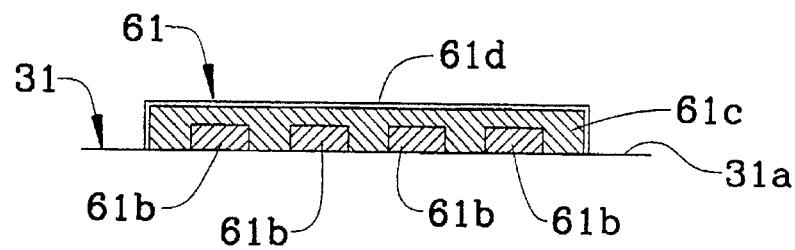
FIG. 6 is a cross-sectional view of a layered structure of the generator shown in FIG. 5.

As shown in FIGS. 5 and 6, the electrode device 61 is adhered to a surface of the outer member 31a by depositing such as sputerring and is covered with a piezoelectric element 61c which is in the form of a thin film or layer of zinc oxide, for example. The piezoelectric element 61c is also adhered to the surface of the outer member 31a by depositing such as sputerring. The whole of the piezoelectric element 61c covering therein the electrode device 61 is covered with a protection or insulating member 61d. The electrode device 61 is formed into an elongated configuration so as to extend along a horizontal direction on an upper portion of the surface of the outer member 31a. It is to be noted that for ensuring as wide a view area as possible of the outer member 31a each of the electrodes 61a and 61b, the piezoelectric member 61c and the protection member 61d is recommended to be made of a transparent material.

In operation, when the switch 62b is turned on or closed, the electrodes 61a and 61b are supplied with an electric current that reverses its direction, thereby expanding and shrinking the piezoelectric element 61c. Thus, surface acoustic waves are generated along the longitudinal side of the electrode 61a (61b) and travel downwardly along the surface of the outer member 31a. As a whole, the resultant or generated surface acoustic waves travel through substantially all the surface area of the outer member 31a. As soon as such surface acoustic waves reach water drops on the surface of the outer member 31a, due to the energy of the surface acoustic waves and the gravity applied to the water drops, the water drops are scattered or atomized, thereby repelling all the water drops on the whole area of the surface of the outer member 31a. Thus, a clear view of the outer member 31a of the mirror assembly 3 can be ensured. It is to be noted that even though each water drop is very small the surface acoustic waves can scatter or atomize the same surely. In addition, the foregoing operation can be established even when the vehicle is at rest.

Figure 7:
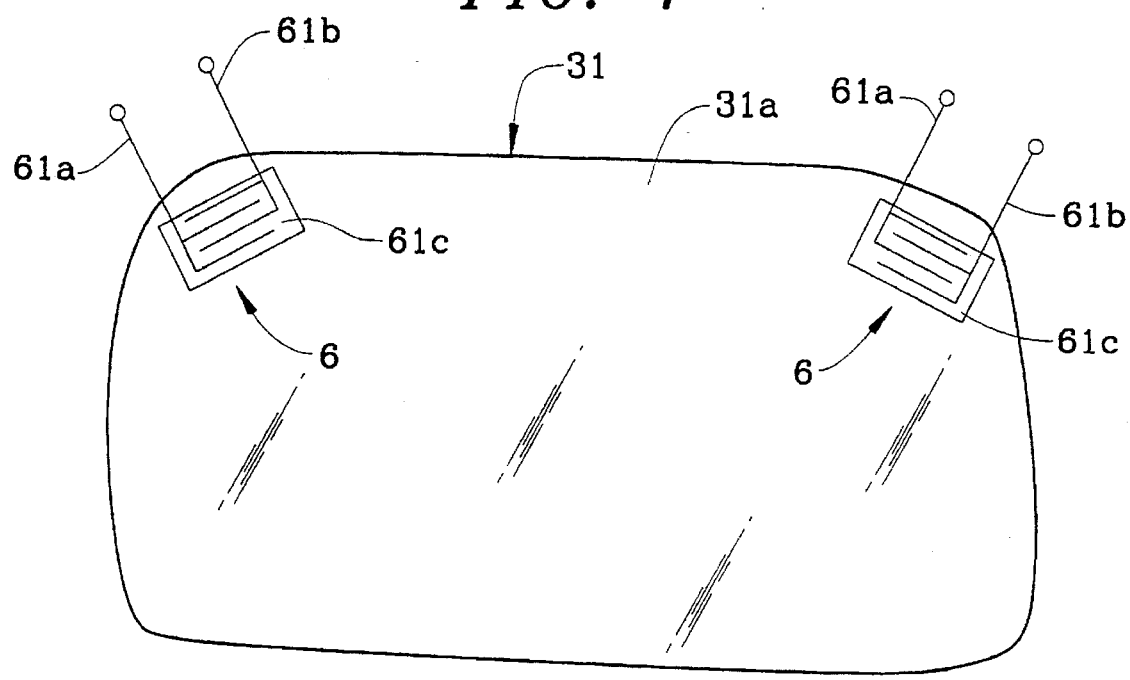
FIG. 7 is a plane view showing a second mode of a generator for generating surface acoustic waves.

In order to establish surface acoustic waves travel along the whole area of the surface of the outer member 31a, as shown in FIG. 7, providing a pair of electrode devices 6 at both upper corners of the outer member 31a can be employed.

Figure 8:
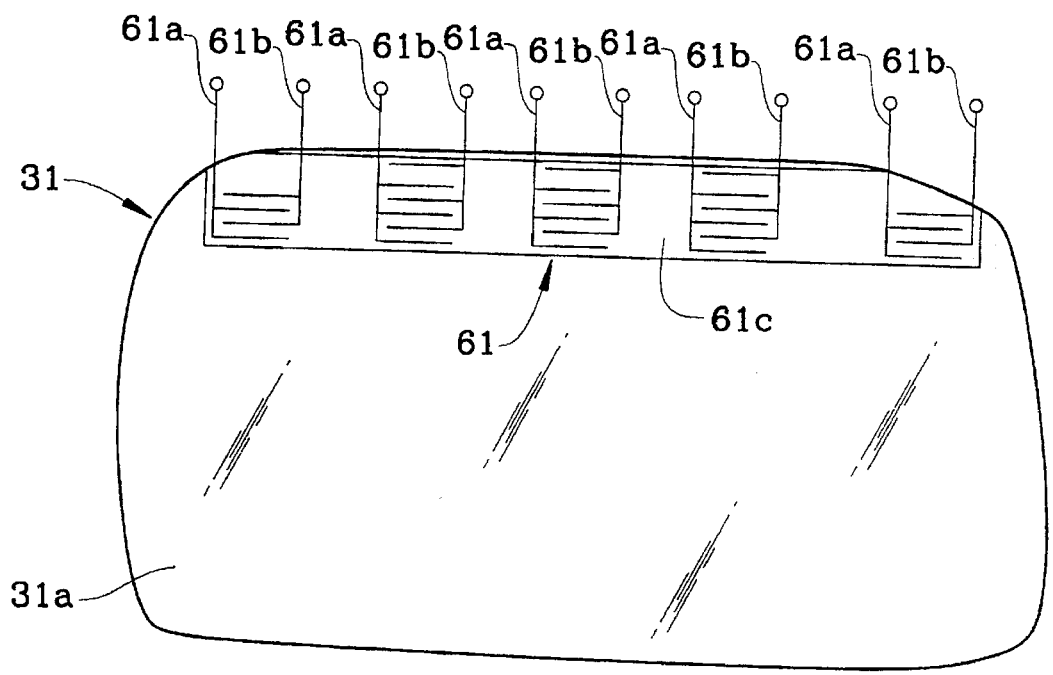
FIG. 8 is a plane view showing a third mode of a generator for generating surface acoustic waves.

As shown in FIG. 8, a plurality of spaced electrode devices 61 are arranged so as to extend along a horizontal direction on an upper portion of the surface of the outer member 31a. In this embodiment, a piezoelectric element 61c is common to the plural electrode devices 61. The merit of such an arrangement is that even though one or more electrode devices 61 experience operational difficulties, the remaining electrode devices 61 can generate surface acoustic waves.

Figure 9:
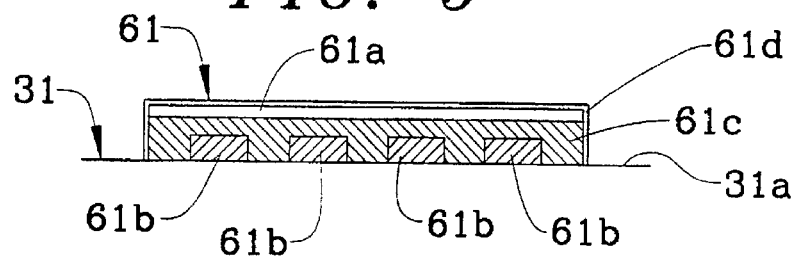
FIG. 9 is a first modification of the layered structure shown in FIG. 6.
Figure 10:
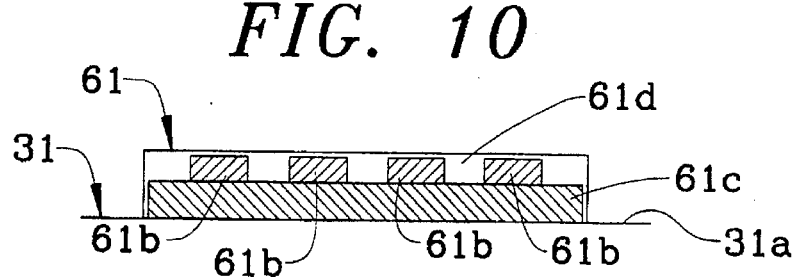
FIG. 10 is a second modification of the layered structure shown in FIG. 6.
Figure 11:
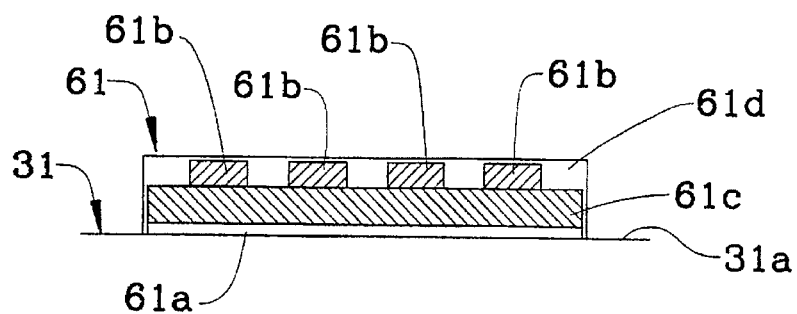
FIG. 11 is a third modification of the layered structure shown in FIG. 6.

In FIG. 9, there is illustrated a first modification of the layered structure of the electrode device 61 wherein the electrode 61a is in the form of a plate mounted on the piezoelectric element 61c accommodating therein the electrode 61b. In FIG. 10, there is illustrated a second modification of the layered structure of the electrode device 61 wherein the piezoelectric element 61c is on the surface of the outer member 31a contrary to the structure shown in FIG. 6. In FIG. 11, there is illustrated a third modification of the layered structure of the electrode device 61 wherein the plate shaped electrode 61a is on the surface of the outer member 31a contrary to the structure shown in FIG. 9.

Figure 12:
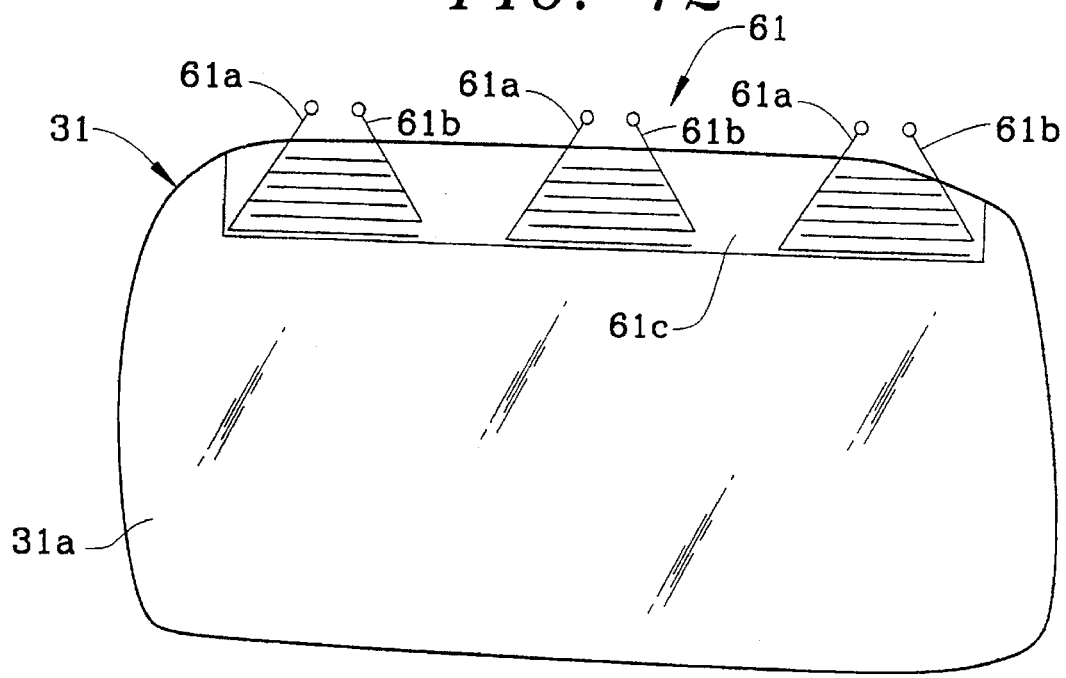
FIG. 12 is a plane view showing a fourth mode of a generator for generating surface acoustic waves.
Figure 13:
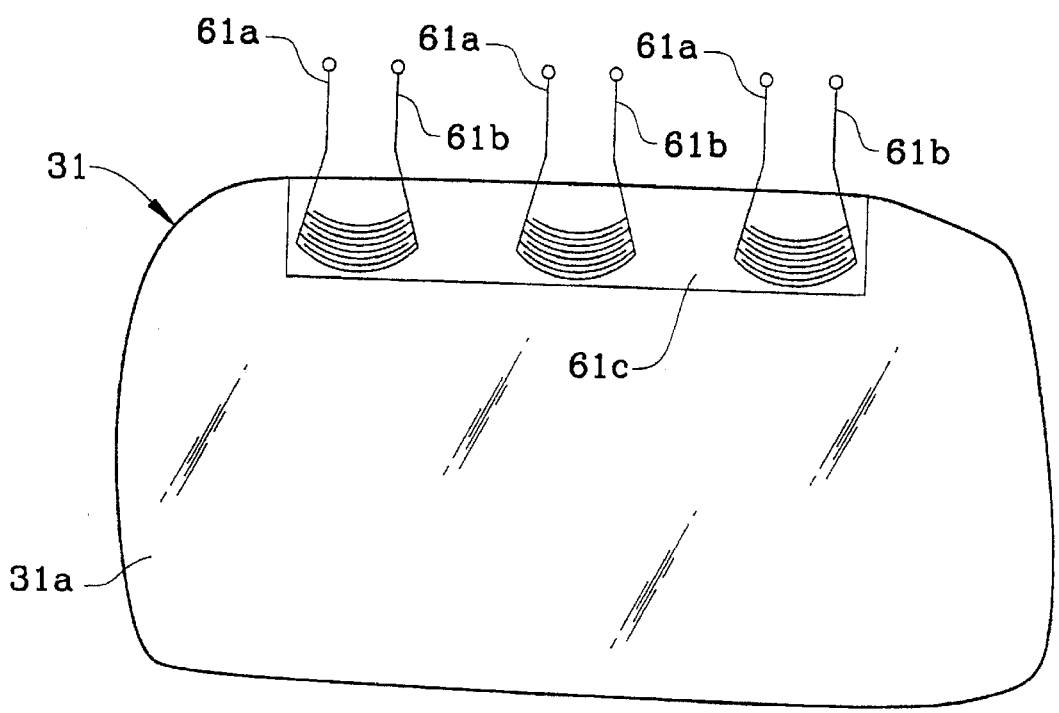
FIG. 13 is a plane view showing a fifth mode of a generator for generating surface acoustic waves.

In FIGS. 12 and 13, each of the electrode devices 6 is spread out like an unfolded fan toward the lower portion of the surface of the outer member 31a. It is to be noted that each of the electrode devices 6 in FIG. 12 possesses a trapezoidal shape in plan view and each of the electrode devices 6 in FIG. 13 is of sector shaped in plan view. It is to be noted that the layered structure of the electrode device 6 shown in FIG. 12 (FIG. 13) can be any one of those in FIG. 6, FIG. 9, FIG. 10 and FIG. 11.

Obviously numerous modifications and variations of the present invention are possible in light of the above teachings. It is therefore to be understood that within the scope of the appended claims, the invention may be practiced otherwise than as specifically described herein.

What is claimed is:

1. A mirror apparatus for use in a vehicle comprising:

a casing for being connected to a side portion of the vehicle;

a mirror member having an outer surface and accommodated within the casing such that the outer surface is oriented substantially perpendicular to a road surface; and a generator positioned at an upper portion of the outer surface of the mirror member for generating surface acoustic waves which travel along the outer surface of the mirror member towards a lower portion of the mirror member, said generator including at least one electrode device having a pair of oppositely spaced electrodes which are adhered to the outer surface of the mirror member, an AC power supply for supplying an electric current to the electrodes which reverses direction at regular intervals, and a piezoelectric element adhered to the outer surface of the mirror member such that the electrodes are interposed between the piezoelectric element and the outer surface of the mirror member, the electrode device being spread out like an unfolded fan toward the lower portion of the outer surface of the mirror member.

2. A mirror apparatus as set forth in claim 1, wherein the electrodes are toothed elements which are arranged such that a tooth of one of the elements is between two adjacent teeth of the other of the elements with gaps disposed between adjacent teeth of different elements.

3. A mirror apparatus as set forth in claim 1, wherein the AC power supply is positioned outside the casing.

4. A mirror apparatus as set forth in claim 1, wherein each of the electrodes is made of an aluminum material.

5. A mirror apparatus as set forth in claim 1, wherein the piezoelectric element is made of zinc oxide.

6. A mirror apparatus as set forth in claim 1, wherein said generator includes a plurality of electrode devices adhered to the outer surface of the mirror member.

7. A mirror apparatus as set forth in claim 6, wherein the electrodes are toothed elements which are arranged such that a tooth of one of the elements is between two adjacent teeth of the other of the elements with gaps disposed between adjacent teeth of different elements.

8. A mirror apparatus as set forth in claim 6, wherein the AC power supply is positioned outside the casing.

9. A mirror apparatus as set forth in claim 6, wherein each of the electrodes is made of an aluminum material.

10. A mirror apparatus as set forth in claim 6, wherein the plurality of electrodes are arranged in the width direction at spaced apart intervals.

11. A mirror apparatus as set forth in claim 6, wherein the piezoelectric element is made of zinc oxide.

* * * * *